US009500255B2

(12) United States Patent
Nowaczyk et al.

(10) Patent No.: US 9,500,255 B2
(45) Date of Patent: Nov. 22, 2016

(54) SHOCK ABSORBER WITH FREQUENCY DEPENDENT PASSIVE VALVE

(71) Applicant: Tenneco Automotive Operating Company Inc., Lake Forest, IL (US)

(72) Inventors: Mark Nowaczyk, Heers (BE); Gunther Bismans, Alken (BE)

(73) Assignee: Tenneco Automotive Operating Company Inc., Lake Forest, IL (US)

( * ) Notice: Subject to any disclaimer, the term of this patent is extended or adjusted under 35 U.S.C. 154(b) by 127 days.

(21) Appl. No.: 14/193,102

(22) Filed: Feb. 28, 2014

(65) Prior Publication Data

US 2015/0247546 A1 Sep. 3, 2015

(51) Int. Cl.
*F16F 9/512* (2006.01)

(52) U.S. Cl.
CPC ..................................... *F16F 9/512* (2013.01)

(58) Field of Classification Search
CPC ............ F16F 9/50; F16F 9/504; F16F 9/512
See application file for complete search history.

(56) References Cited

U.S. PATENT DOCUMENTS

| | | | | |
|---|---|---|---|---|
| 4,453,638 A | * | 6/1984 | Wallace | F16F 9/446 188/282.9 |
| 5,129,488 A | * | 7/1992 | Furuya | B60G 17/08 188/282.6 |
| 5,248,014 A | | 9/1993 | Ashiba | |
| 5,261,448 A | * | 11/1993 | Furuya | B60G 17/08 137/513.5 |
| 5,386,892 A | | 2/1995 | Ashiba | |
| 5,423,402 A | | 6/1995 | de Kock | |
| 5,467,852 A | | 11/1995 | de Kock | |
| 6,290,035 B1 | * | 9/2001 | Kazmirski | F16F 9/34 188/282.5 |
| 6,334,516 B1 | | 1/2002 | Shirley et al. | |
| 7,395,907 B2 | | 7/2008 | de Kock et al. | |
| 7,699,148 B2 | * | 4/2010 | Forster | F16F 9/3485 137/625.12 |
| 7,958,981 B2 | * | 6/2011 | Teraoka | F16F 9/5126 188/298 |
| 8,967,344 B2 | * | 3/2015 | Park | F16F 9/3405 188/280 |

(Continued)

FOREIGN PATENT DOCUMENTS

| | | |
|---|---|---|
| DE | 4327358 A1 | 10/1994 |
| DE | 60210652 T2 | 8/2006 |
| EP | 1442227 | 8/2004 |

(Continued)

OTHER PUBLICATIONS

International Search Report and Written Opinion dated Jun. 10, 2015 in corresponding PCT Application No. PCT/US2015/016571 (11 pages).

*Primary Examiner* — Robert A Siconolfi
*Assistant Examiner* — James Hsiao
(74) *Attorney, Agent, or Firm* — Harness, Dickey & Pierce, P.L.C.

(57) ABSTRACT

A shock absorber has a pressure tube with a piston assembly slidably disposed within the pressure tube and attached to a piston rod. The piston assembly divides the pressure tube into an upper working chamber and a lower working chamber. The piston assembly includes a frequency dependent valve assembly attached to the piston rod which defines a housing attached to the piston rod and a spool valve assembly. The spool valve assembly includes a spool valve and first and second bypass valve assemblies that control fluid flow through bypass passage that bypasses the piston assembly.

19 Claims, 8 Drawing Sheets

(56) References Cited

U.S. PATENT DOCUMENTS

| | | | |
|---|---|---|---|
| 2012/0160620 A1* | 6/2012 | Yamashita | B60G 13/08 188/266.5 |
| 2012/0217106 A1 | 8/2012 | O'Flynn et al. | |
| 2013/0056317 A1 | 3/2013 | Kim | |
| 2013/0140117 A1 | 6/2013 | Yu | |
| 2014/0048365 A1 | 2/2014 | Kim | |

FOREIGN PATENT DOCUMENTS

| | | |
|---|---|---|
| JP | 07-174183 | 7/1995 |
| JP | 07-217696 | 8/1995 |
| JP | 8-135715 | 5/1996 |
| JP | 2011007213 A | 1/2011 |
| KR | 10-2014-0022583 | 2/2014 |
| WO | 2011/120119 A1 | 10/2011 |

\* cited by examiner

Shock Absorber with Frequency Dependent Passive Valve

FIELD OF THE INVENTION

The present disclosure relates to a hydraulic damper or shock absorber adapted for use in a suspension system such as the systems used for automotive vehicles. More particularly, the present disclosure relates to a hydraulic damper having a frequency dependent passive valving system that provides softer damping characteristics with high frequency road inputs in both rebound and compression strokes.

BACKGROUND OF THE INVENTION

A conventional prior art hydraulic damper or shock absorber comprises a cylinder defining a working chamber having a piston slidably disposed in the working chamber with the piston separating the interior of the cylinder into an upper and a lower working chamber. A piston rod is connected to the piston and extends out of one end of the cylinder. A first valving system is incorporated for generating damping force during the extension or rebound stroke of the hydraulic damper and a second valving system is incorporated for generating damping force during the compression stroke of the hydraulic damper.

Various types of damping force generating devices have been developed to generate desired damping forces in relation to the frequency of the inputs from the roads over which the vehicle travels. These frequency dependent selective damping devices provide the ability to have softer damping characteristics with higher frequency road inputs. These softer damping characteristics lead to a more effective isolation of the vehicle body from unwanted disturbances. Typically these frequency dependent damping devices operate only during an extension or rebound movement of the hydraulic damper or shock absorber. Thus, there is a need for a frequency dependent selective damping device that provides the ability to have softer damping characteristics in both rebound and compression movements of the hydraulic damper or shock absorber in response to the higher frequency road inputs.

The continued development of hydraulic dampers includes the development of frequency dependent damping devices that function in both an extension or rebound movement and a compression movement of the hydraulic damper or shock absorber.

SUMMARY OF THE INVENTION

The present disclosure provides the art with a frequency dependent hydraulic damper or shock absorber that provides soft damping in both rebound and compression strokes of the hydraulic damper or shock absorber. Soft damping is provided for the higher frequency road inputs in both the extension and/or rebound stroke and the compression stroke of the hydraulic damper or shock absorber.

Further areas of applicability of the present disclosure will become apparent from the detailed description provided hereinafter. It should be understood that the detailed description and specific examples, while indicating the preferred embodiment of the disclosure, are intended for purposes of illustration only and are not intended to limit the scope of the disclosure.

BRIEF DESCRIPTION OF THE DRAWINGS

The present disclosure will become more fully understood from the detailed description and the accompanying drawings, wherein.

DETAILED DESCRIPTION OF THE PREFERRED EMBODIMENTS

The following description of the preferred embodiment(s) is merely exemplary in nature and is in no way intended to limit the disclosure, its application, or uses.

Figure 1:
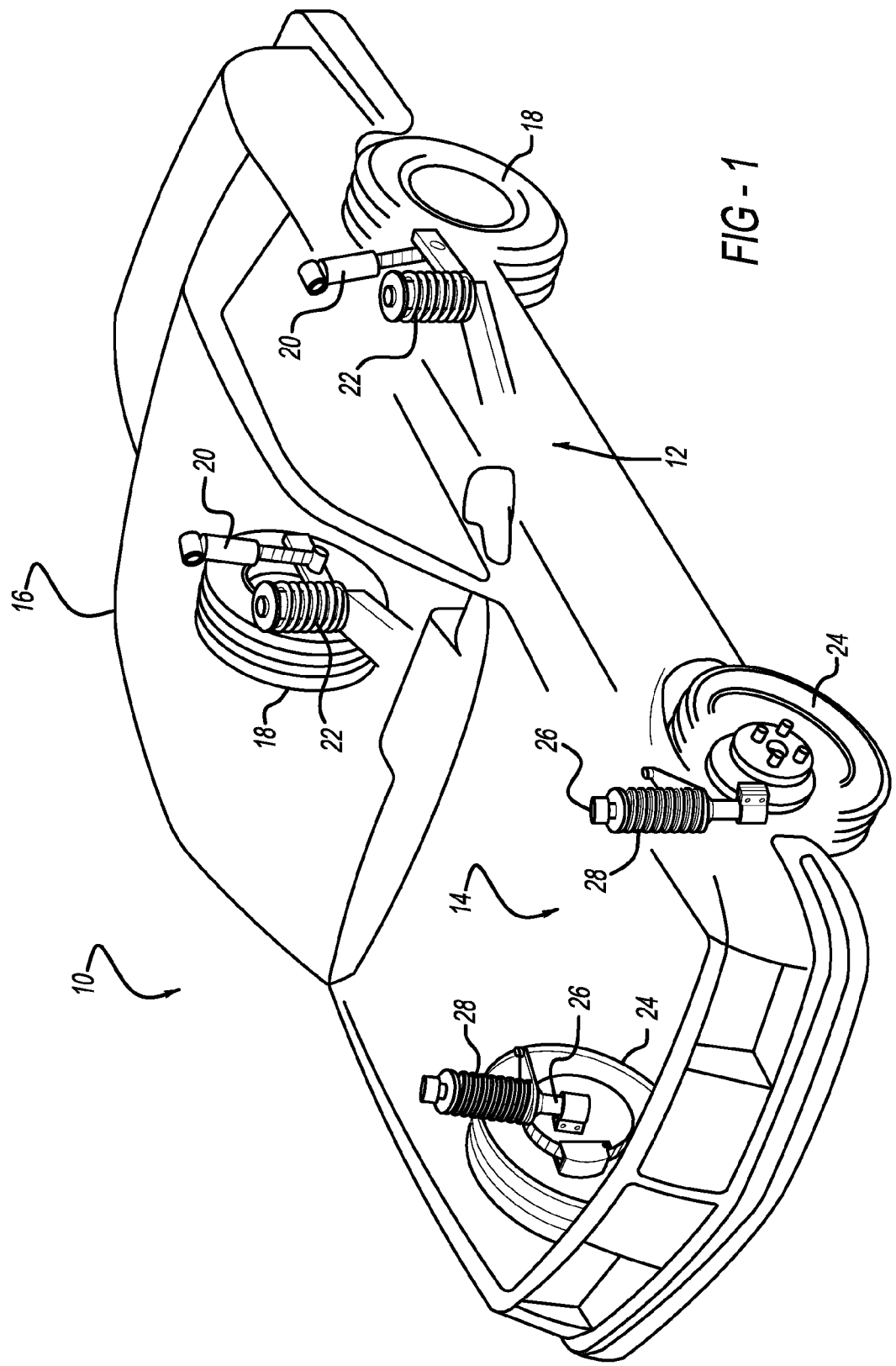
FIG. 1 is an illustration of an automobile using shock absorbers incorporating the frequency dependent damping device in accordance with the present disclosure.

Referring now to the drawings in which like reference numerals designate like or corresponding parts throughout the several views, there is shown in FIG. 1 a vehicle incorporating a suspension system having the frequency dependent shock absorbers in accordance with the present disclosure which is designated generally by the reference numeral 10. Vehicle 10 includes a rear suspension 12, a front suspension 14 and a body 16. Rear suspension 12 has a transversely extending rear axle assembly (not shown) adapted to operatively support the vehicle's rear wheels 18. The rear axle assembly is operatively connected to body 16 by means of a pair of shock absorbers 20 and a pair of helical coil springs 22. Similarly, front suspension 14 includes a transversely extending front axle assembly (not shown) to operatively support the vehicle's front wheels 24. The front axle assembly is operatively connected to body 16 by means of a second pair of shock absorbers 26 and by a pair of helical coil springs 28. Shock absorbers 20 and 26 serve to dampen the relative motion of the unsprung portion (i.e. front and rear suspensions 12 and 14, respectively) and the sprung portion (i.e. body 16) of vehicle 10. While vehicle 10 has been depicted as a passenger car having front and rear axle assemblies, shock absorbers 20 and 26 may be used with other types of vehicles or in other types of applications such as vehicles incorporating independent front and/or independent rear suspension systems. Further, the term "shock absorber" as used herein is meant to refer to dampers in general and thus will include MacPherson struts.

Figure 2:
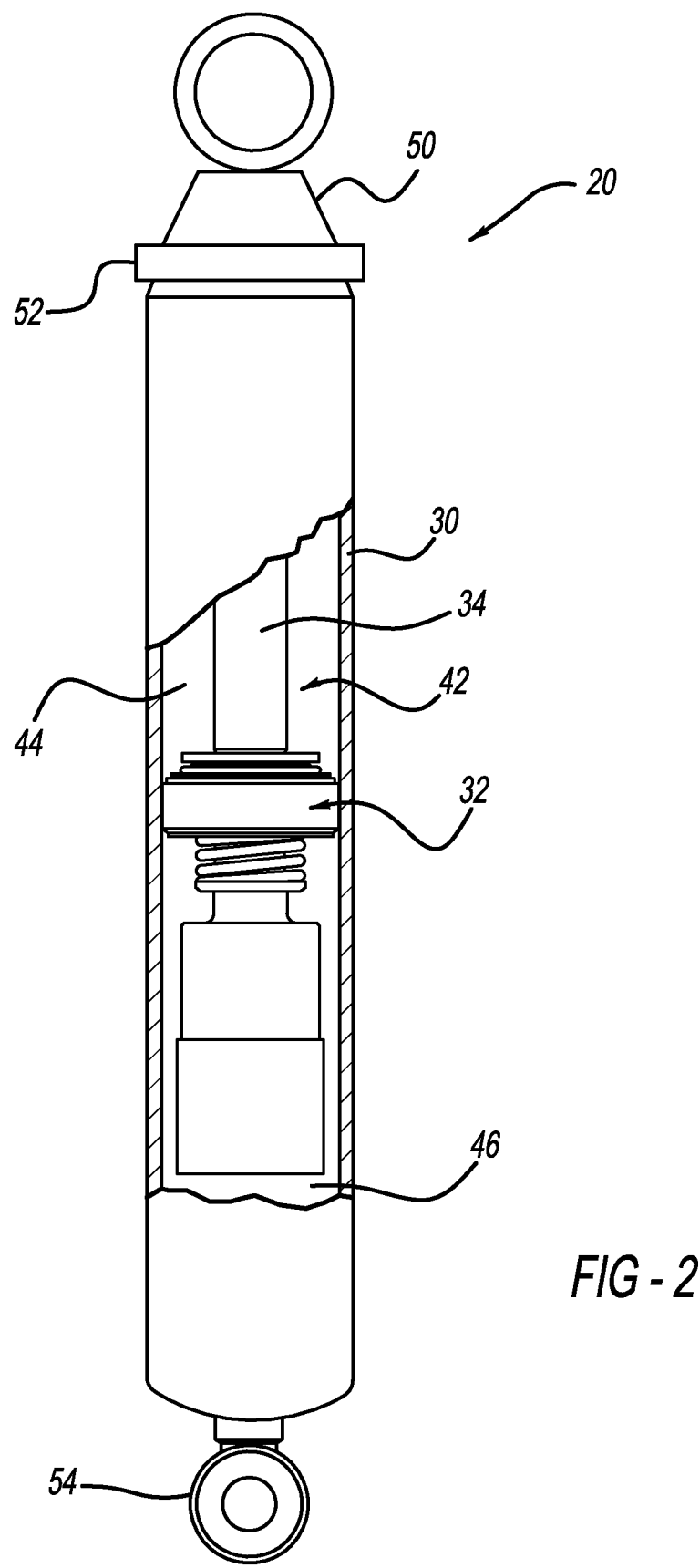
FIG. 2 is a cross-sectional side view of a monotube shock absorber incorporating the frequency dependent damping device in accordance with the present disclosure.

Referring now to FIG. 2, shock absorber 20 is shown in greater detail. While FIG. 2 shows only shock absorber 20, it is to be understood that shock absorber 26 also includes the piston assembly described below for shock absorber 20. Shock absorber 26 only differs from shock absorber 20 in the way in which it is adapted to be connected to the sprung and unsprung portions of vehicle 10. Shock absorber 20 comprises a pressure tube 30, a piston assembly 32 and a piston rod 34.

Pressure tube 30 defines a fluid chamber 42. Piston assembly 32 is slidably disposed within pressure tube 30 and divides fluid chamber 42 into an upper working chamber 44 and a lower working chamber 46. A seal 48 is disposed between piston assembly 32 and pressure tube 30 to permit sliding movement of piston assembly 32 with respect to pressure tube 30 without generating undue frictional forces as well as sealing upper working chamber 44 from lower working chamber 46. Piston rod 34 is attached to piston assembly 32 and extends through upper working chamber 44 and through an upper end cap 50 which closes the upper end of pressure tube 30. A sealing system 52 seals the interface between upper end cap 50 and piston rod 34. The end of piston rod 34 opposite to piston assembly 32 is adapted to be secured to the sprung portion of vehicle 10. In the preferred embodiment, piston rod 34 is secured to body 16 or the sprung portion of vehicle 10. Pressure tube 30 is filled with fluid and it includes a fitting 54 for attachment to the unsprung portion of the vehicle. In the preferred embodiment fitting 54 is secured to the unsprung portion of the vehicle. Thus, suspension movements of the vehicle will cause extension or compression movements of piston assembly 32 with respect to pressure tube 30. Valving within piston assembly 32 controls the movement of fluid between upper working chamber 44 and lower working chamber 46 during movement of piston assembly 32 within pressure tube 30.

Figure 3:
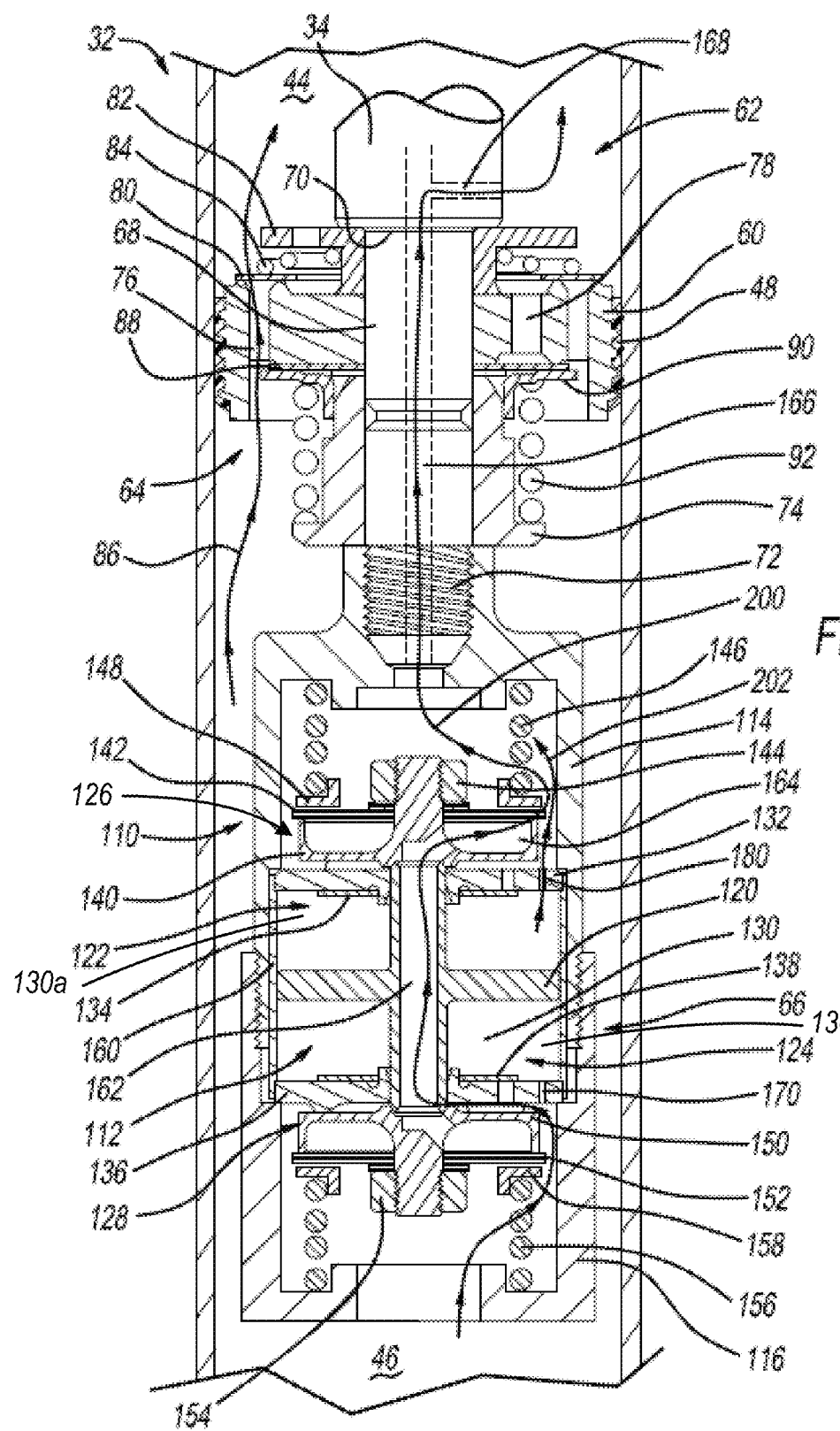
FIG. 3 is an enlarged cross-sectional side view illustrating the piston assembly of the shock absorber shown in FIG. 1 during a compression stroke of the shock absorber.
Figure 4:
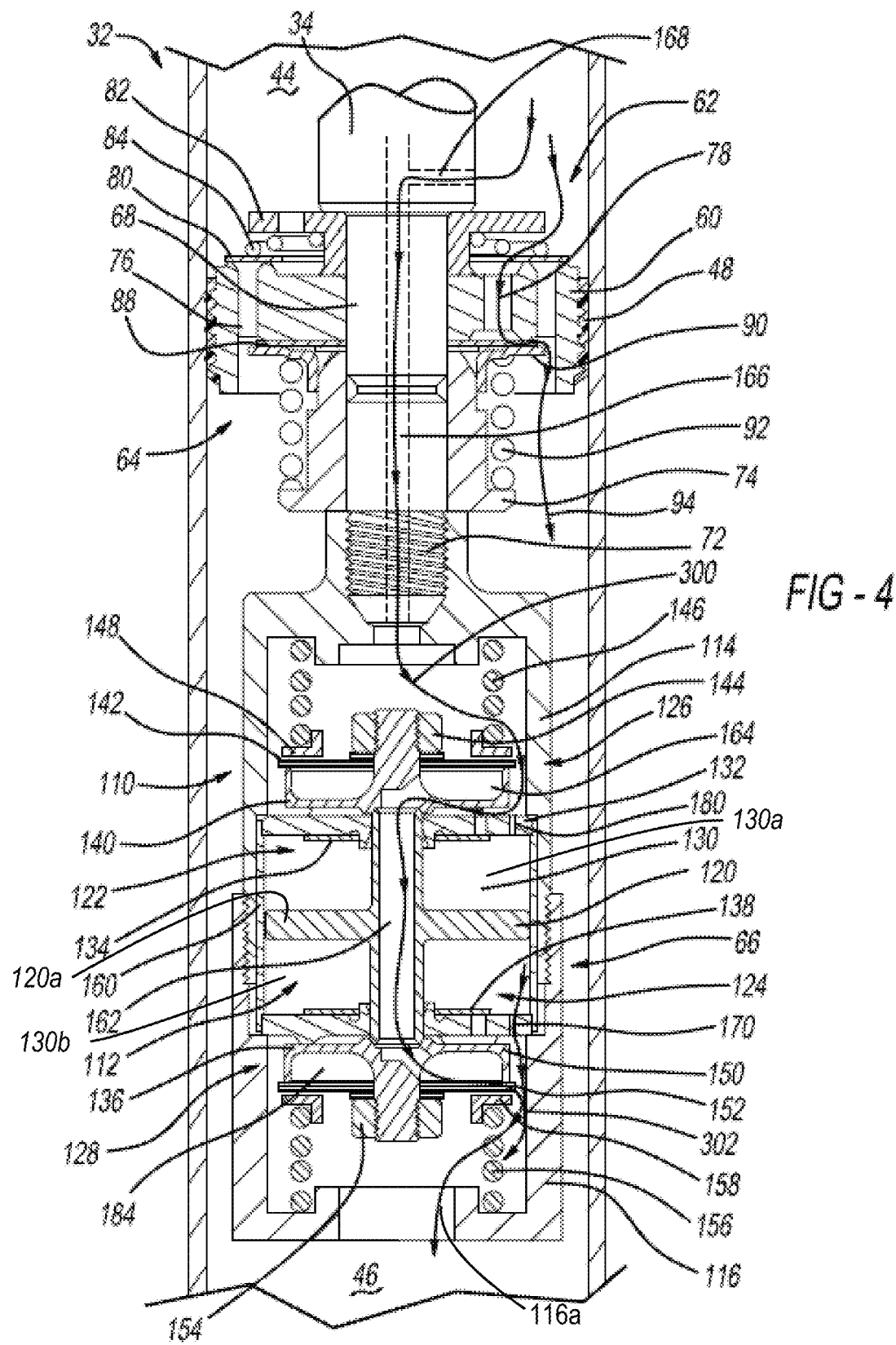
FIG. 4 is an enlarged cross-sectional side view illustrating the piston assembly of the shock absorber shown in FIG. 1 during an extension stroke of the shock absorber.

Referring now to FIGS. 3 and 4, piston assembly 32 is attached to piston rod 34 and comprises a piston body 60, a compression valve assembly 62, an extension or rebound valve assembly 64 and a frequency dependent valve assembly 66. Piston rod 34 includes a reduced diameter section 68 located on the end of piston rod 34 disposed within pressure tube 30 to form a shoulder 70 for mounting the remaining components of piston assembly 32. Piston body 60 is located on reduced diameter section 68 with compression valve assembly 62 being located between piston body 60 and shoulder 70 and with rebound valve assembly 64 being located between piston body 60 and a threaded end 72 of piston rod 34. A retaining nut 74 is threadingly or slidingly received on threaded end 72 or reduced diameter section 68 of piston rod 34 to secure piston body 60, compression valve assembly 62 and extension or rebound valve assembly 64 to piston rod 34. Piston body 60 defines a plurality of compression flow passages 76 and a plurality of rebound flow passages 78.

Compression valve assembly 62 comprises a compression valve plate 80, a valve stop 82 and a spring 84. Valve plate 80 is disposed adjacent to piston body 60 to cover the plurality of compression flow passages 76. Valve stop 82 is disposed adjacent shoulder 70 and spring 84 is disposed between valve plate 80 and valve stop 82 to bias valve plate 80 against piston body 60. During a compression stroke of shock absorber 20, fluid pressure builds up in lower working chamber 46 until the fluid pressure applied to valve plate 80 through compression flow passages 76 overcomes the load provided by spring 84. Valve plate 80 will move away from piston body 60 and compress spring 84 to open compression flow passages 76 to allow fluid to flow from lower working chamber 46 to upper working chamber 44 as shown by arrows 86 in FIG. 3.

Rebound valve assembly 64 comprises one or more valve plates 88, a spring seat 90 and a spring 92. Valve plates 88 are disposed adjacent to piston body 60 to cover the plurality of rebound flow passages 78. Spring seat 90 is disposed immediately adjacent valve plates 88. Spring 92 is disposed between spring seat 90 and retaining nut 74 to bias spring seat 90 against valve plates 88 and valve plates 88 against piston body 60. Retaining nut 74 is threaded onto threaded end 72 of piston rod 34 to retain valve plates 88 against piston body 60 to close rebound flow passages 78 using spring 92 and spring seat 90. During an extension stroke of shock absorber 20, fluid pressure builds up in upper working chamber 44 until the fluid pressure applied to valve plates 88 through rebound flow passages 78 overcomes the load provided by spring 92. Valve plates 88 will move away from piston body 60 and compress spring 92 to open rebound flow passages 78 to allow fluid to flow from upper working chamber 44 to lower working chamber 46 as shown by arrows 94 in FIG. 4.

Referring now to FIGS. 3 and 4, frequency dependent valve assembly 66 is illustrated. Frequency dependent valve assembly 66 comprises a housing assembly 110 and a spool valve assembly 112. Housing assembly 110 includes an upper housing 114 and a lower housing 116. Upper housing 114 is threadingly or otherwise attached to the end of the piston rod 34. Lower housing 116 is threadingly or otherwise attached to upper housing 114.

Spool valve assembly 112 includes a spool valve 120, a first check valve 122, a second check valve 124, a first interface assembly 126 and a second interface assembly 128. Spool valve 120 is disposed within a cavity 130 defined by housing assembly 110. First check valve 122 includes a valve seat 132 and a valve plate 134. Second check valve 124 includes a valve seat 136 and a valve plate 138. First interface assembly 126 includes a valve seat 140, a plurality of discs 142, a locknut 144, a spring 146 and a spring seat 148. Second interface assembly 128 includes a valve seat 150, a plurality of discs 152, a locknut 154, a spring 156 and a spring seat 158. Valve seat 140 and the plurality of discs 142 form a first bypass valve assembly that defines a first bypass chamber 164. Valve seat 150 and the plurality of discs 152 form a second bypass valve assembly that defines a second bypass chamber 184.

Valve seat 132 is disposed at one end of spool valve 120 and valve seat 136 is located at the opposite end of spool valve 120. Spool valve 120 is slidably disposed within both valve seat 132 and valve seat 136. A spacer 160 extends between valve seat 132 and valve seat 136.

Valve seat 140 is disposed against valve seat 132. The plurality of discs 142 are disposed against valve seat 140. Locknut 144 is threadingly or otherwise attached to valve seat 140 to secure the plurality of discs 142 to valve seat 140. Spring seat 148 is disposed against the plurality of discs 142 and spring 146 is disposed between housing assembly 110 and spring seat 148. Spring 146 biases spring seat 148 against the plurality of discs 142 and the plurality of discs 142 against valve seat 140.

Valve seat 150 is disposed against valve seat 136. The plurality of discs 152 are disposed against valve seat 150. Locknut 154 is threadingly or otherwise attached to valve seat 150 to secure the plurality of discs 152 to valve seat 150. Spring seat 158 is disposed against the plurality of discs 152 and spring 156 is disposed between housing assembly 110 and spring seat 158. Spring 156 biases spring seat 158 against the plurality of discs 152 and the plurality of discs 152 against valve seat 150.

FIG. 3 illustrates fluid flow during a compression stroke of shock absorber 20. During a compression stroke, fluid pressure in compression flow passage 76 increases. The fluid pressure in compression flow passage 76 will increase until the biasing load on valve plate 80 increases to the point that spring 84 is compressed and valve plate 80 is lifted entirely off of piston body 60 to fully open compression flow passages 76 as illustrated by arrow 86. Compression valve assembly 62 is a passive valve assembly with a firm damping characteristic.

At the beginning of the compression stroke prior to the opening of compression valve assembly 62, fluid will flow through an open bypass fluid flow path indicated by arrow 200 which bypasses piston body 60, compression valve assembly 62 and rebound valve assembly 64. Flow path 200 extends from lower working chamber 46 through an axial passage 162 in spool valve 120 and into the bypass chamber 164 defined by valve seat 140 and the plurality of discs 142. Flow path 200 proceeds around the plurality of discs 142 and into an axial fluid passage 166 and a radial fluid passage 168 both extending through piston rod 34. During a high frequency movement, spool valve 120 moves only a small distance. This movement of spool valve 120 is caused by fluid flow through second check valve 124 which pressurizes cavity portion 130b below the annular flange 120a of spool valve 120. Spool valve 120 does not get time to move far enough upwards. Because of this small movement, the preload created by spring 146 is low and the fluid pressure will easily deflect the plurality of discs 142 to create the fluid flow illustrated by arrow 200, which depicts fluid flow through axial fluid passage 166 and radial passage 168, both of which extend through piston rod 34 into upper working chamber 44. During a low frequency movement, spool valve 120 is able to move a significant distance due to the flow of fluid through second check valve 124. This larger movement will move valve seat 140, the plurality of discs 142 and spring seat 148. This movement will compress spring 146 which increases the preload generated by spring 146 and the fluid pressure required to separate the plurality of discs 142 from valve seat 140. As the load generated by spring 146 increases, the flow depicted by arrow 200 will decrease to provide a smooth transition from an initially soft damping condition to a firm damping condition for shock absorber 20. The slow closing of fluid flow 200 by the movement of spool valve 120 will provide the smooth transition. Arrow 202 depicts the flow of fluid caused by the movement of spool valve 120. Fluid flows from cavity 130b above the annular flange 120a of spool valve 120, through a tuned orifice 180 and into axial fluid passage 166, which leads to radial passage 168, which in turn leads to upper working chamber 44. First check valve 122 remains closed during this larger movement and opens to allow for the return of fluid into cavity portion 130b above the annular flange 120a of spool valve 120.

FIG. 4 illustrates fluid flow during a rebound stroke of shock absorber 20. During a rebound stroke, fluid pressure in rebound flow passage 78 increases. The fluid pressure in rebound flow passage 78 will increase until the biasing load on valve plate 88 increases to the point that spring 92 is compressed and valve plate 88 is lifted entirely off of piston body 60 to fully open rebound flow passages 78 as illustrated by arrow 94. Rebound valve assembly 64 is a passive valve assembly with a firm damping characteristic.

At the beginning of the rebound stroke prior to the opening of rebound valve assembly 64, fluid will flow through an open bypass fluid flow path indicated by arrow 300 which bypasses piston body 60, compression valve assembly 62 and rebound valve assembly 64. Flow path 300 extends from upper working chamber 44 through radial fluid passage 168, through axial fluid passage 166, through axial passage 162 in spool valve 120 and into the second bypass chamber 184 defined by valve seat 150 and the plurality of discs 152. Flow path 300 proceeds around the plurality of discs 152 and out into lower working chamber 46 through an aperture 116a formed in lower housing 116. During a high frequency movement, spool valve 120 moves only a small distance. This movement of spool valve 120 is caused by fluid flow through first check valve 122 which pressurizes cavity 130b below the annular flange 120a of spool valve 120. Spool valve 120 does not get time to move far enough downwards. Because of this small movement, the preload created by spring 156 is low and the fluid pressure will easily deflect the plurality of discs 152 to create the fluid flow illustrated by arrow 300 which depicts fluid flow through axial fluid passage 166 and radial passage 168, both of which extend through piston rod 34 from upper working chamber 44. During a low frequency movement, spool valve 120 is able to move a significant distance due to the flow of fluid through first check valve 122. This larger movement will move valve seat 150, the plurality of discs 152 and spring seat 158. This movement will compress spring 156 which increases the preload generated by spring 156 and the fluid pressure required to separate the plurality of discs 152 from valve seat 150. As the load generated by spring 156 increases, the flow depicted by arrow 300 will decrease to provide a smooth transition from an initially soft damping condition to a firm damping condition for shock absorber 20. The slow closing of fluid flow 300 by the movement of spool valve 120 will provide the smooth transition. Arrow 302 depicts the flow of fluid caused by the movement of spool valve 120. Fluid flows from cavity portion 130b below the annular flange 120a of spool valve 120 through tuned orifice 170 and into lower working chamber 46. Second check valve 124 remains closed during this larger movement and opens to allow for the return of fluid into cavity 130b below the annular flange 120a of spool valve 120.

Referring now to FIGS. 5-8, a frequency dependent valve assembly 266 is illustrated. Frequency dependent valve assembly 266 comprises a housing assembly 310 and a spool valve assembly 312. Housing assembly 310 includes an upper housing 314 and a lower housing 316. Upper housing 314 is threadingly received or otherwise attached to the end of piston rod 34. Lower housing 316 is press fit, threadingly or otherwise attached to upper housing 314.

Spool valve assembly 312 includes a first disc valve assembly 320, a first check valve 322, a first spool valve assembly 324, a second spool valve assembly 326, a second check valve 328 and a second disc valve assembly 330.

First disc valve assembly 320 includes a housing 340, a pin 342, a plurality of valve discs 344, a valve body 346 and an interface 348. Housing 340 is press fit or otherwise received into lower housing 316. Pin 342 is press fit or otherwise attached to housing 340. The plurality of valve discs 344 are disposed between housing 340 and valve body 346. Valve body 346 is slidingly received on pin 342. Interface 348 is disposed between valve body 346 and first spool valve assembly 324.

First check valve 322 controls fluid flow through a plurality of apertures 350 extending through valve body 346. First check valve 322 allows fluid flow from first disc valve assembly 320 to first spool valve assembly 324 but prohibits fluid flow from first spool valve assembly 324 to first disc valve assembly 320.

First spool valve assembly 324 includes a valve seat 360, at least one valve plate 362 and a spool valve 364. Valve seat 360 is press fit or otherwise attached to lower housing 316. The at least one valve plate 362 closes a plurality of apertures 366 extending through valve seat 360. The at least one valve plate 362 allows fluid flow from axial fluid passage 166 in piston rod 34 into a chamber 368 defined between valve seat 360 and spool valve 364 and prohibits some but not all of fluid flow from chamber 368 to axial fluid passage 166. An orifice 370 allows limited flow from chamber 368 to axial fluid passage 166. Spool valve 364 is slidingly received within lower housing 316. A seal 372 seals the interface between spool valve 364 and lower housing 316. Spool valve 364 is also slidingly received within valve seat 360. A spacer 374 acts as a stop for spool valve 364. Spacer 374 is located between spool valve 364 and an annular extension 376 formed by lower housing 316.

Second disc valve assembly 330 includes a housing 440, a pin 442, a plurality of valve discs 444, a valve body 446 and an interface 448. Housing 440 is press fit or otherwise received into lower housing 316. A plurality of apertures 450 are open to lower working chamber 46. Pin 442 is press fit or otherwise attached to housing 440. The plurality of valve discs 444 are disposed between housing 440 and valve body 446. Valve body 446 is slidingly received on pin 442. Interface 448 is disposed between valve body 446 and second spool valve assembly 326.

Second check valve 328 controls fluid flow through a plurality of apertures 452 extending through valve body 446. Second check valve 328 allows fluid flow from second disc valve assembly 330 to second spool valve assembly 326 but prohibits fluid flow from second spool valve assembly 326 to second disc valve assembly 330.

Second spool valve assembly 326 includes a valve seat 380, at least one valve plate 382 and a spool valve 384. Valve seat 380 is press fit or otherwise attached to lower housing 316. The at least one valve plate 382 closes a plurality of apertures 386 extending through valve seat 380. The at least one valve plate 382 allows fluid flow from lower working chamber 46 into a chamber 388 defined between valve seat 380 and spool valve 384 and prohibits some but not all of fluid flow from chamber 388 to lower working chamber 46. An orifice 390 allows limited flow from chamber 388 to lower working chamber 46. Spool valve 384 is slidingly received within lower housing 316. A seal 392 seals the interface between spool valve 384 and lower housing 316. Spool valve 384 is also slidingly received within valve seat 380. A spacer 394 acts as a stop for spool valve 384. Space 394 is located between spool valve 384 and annular extension 376 formed by lower housing 316.

Figure 5:
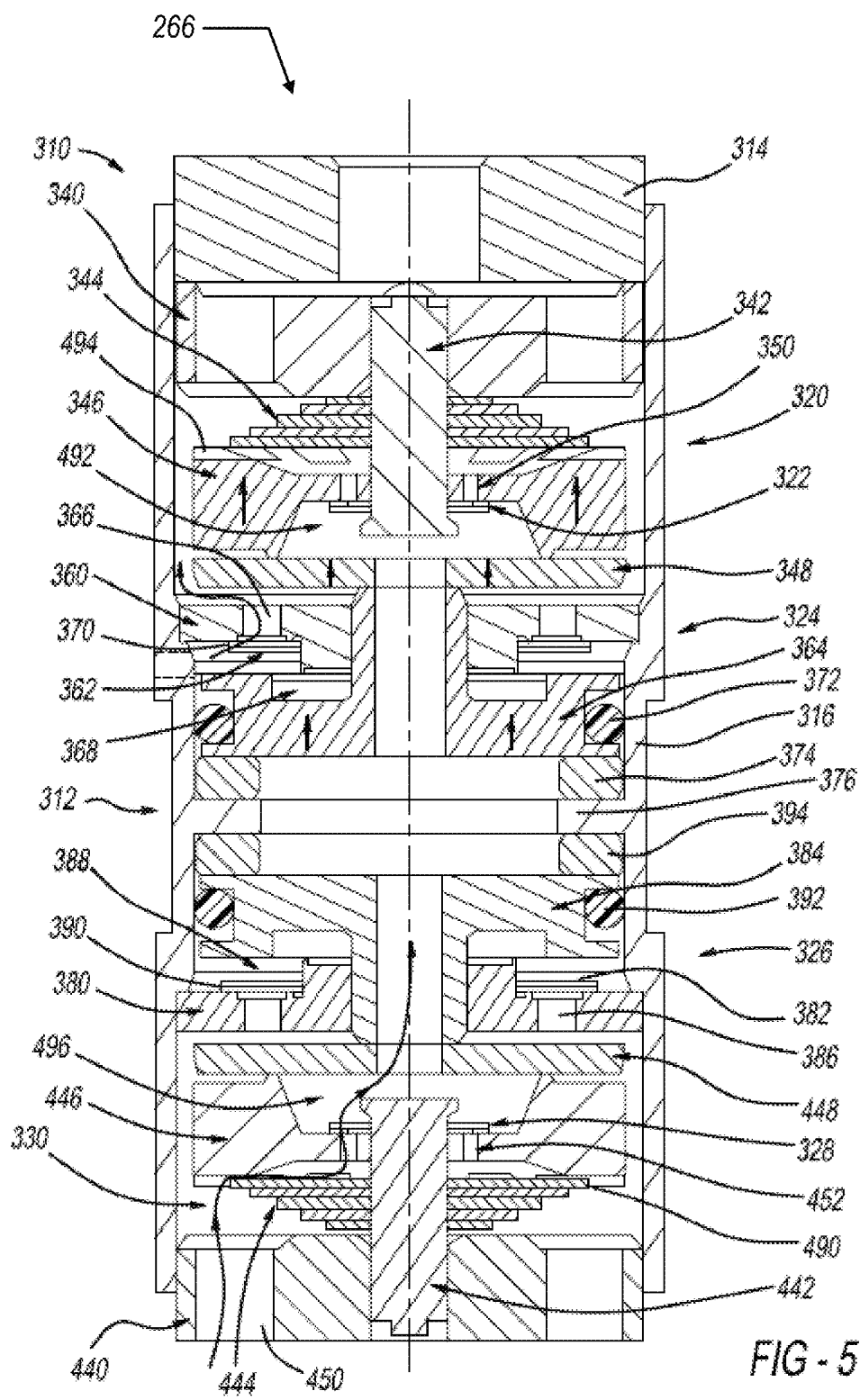
FIG. 5 is an enlarged cross-sectional side view illustrating a frequency dependent valve assembly in accordance with the present disclosure during a low frequency compression stroke.

Referring now to FIG. 5, fluid flow during a low frequency compression stroke is illustrated. During a compression stroke at low frequency, fluid enters frequency dependent valve assembly 266 through apertures 450 in housing 440. Fluid flows between the plurality of valve discs 444 and valve body 446 through an orifice 490 and opens second check valve 328. Spool valve 364 moves slowly upwards together with interface 348 and valve body 346 against the plurality of valve discs 344. Chamber 368 is then pressurized as fluid can only escape chamber 368 through orifice 370. The upward movement of spool valve 364 increases the preload on the plurality of valve discs 344 which keep valve body 346 closed against interface 348 which block fluid flow from bypassing first disc valve assembly 320 by flowing between valve body 346 and interface 348.

Figure 6:
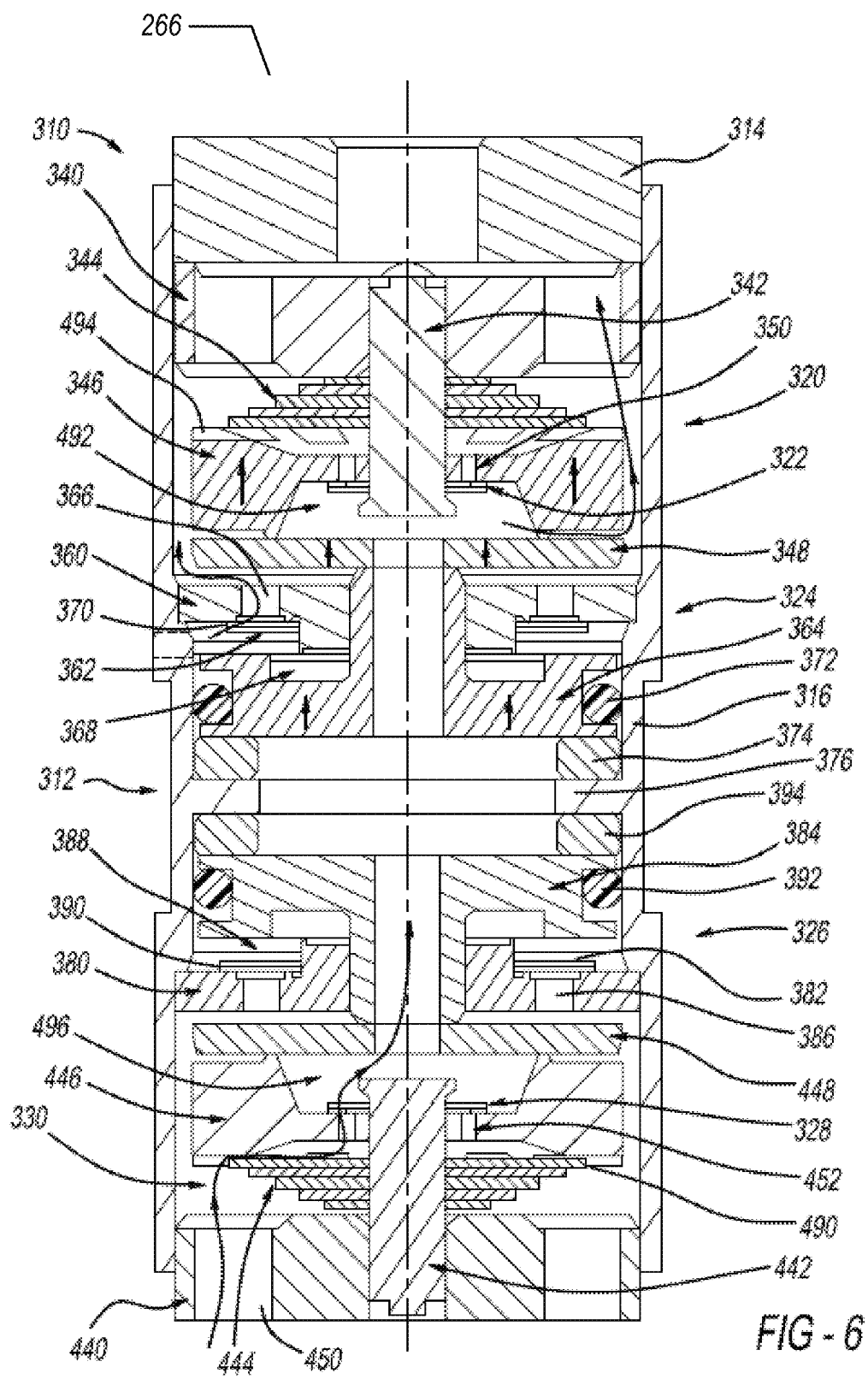
FIG. 6 is an enlarged cross-sectional side view illustrating the frequency dependent valve assembly shown in FIG. 5 during a high frequency compression stroke.

Referring now to FIG. 6, fluid flow during a high frequency compression stroke is illustrated. During a high frequency compression stroke, fluid enters frequency dependent valve assembly 266 through apertures 450 in housing 440. Fluid flows between the plurality of valve discs 444 and valve body 446 through orifice 490 and opens second check valve 328. Spool valve 364 does not get time to move far enough upwards to push interface 348 and preload valve body 346 against the plurality of valve discs 344 because of the high frequency of the compression stroke. Fluid pressure increases rapidly in a chamber 492 below valve body 346. The blow-off pressure in chamber 492 will eventually be high enough to lift valve body 346 away from interface 348 and fluid within chamber 492 will flow to upper working chamber 44 through axial fluid passageway 166 in piston rod 34 to create a bypass flow through piston assembly 32. Thus, during a high frequency compression stroke, the fluid bypasses piston assembly 32 to provide a soft damping while during a low frequency compression stroke, the bypass is closed resulting in a firmer damping.

Figure 7:
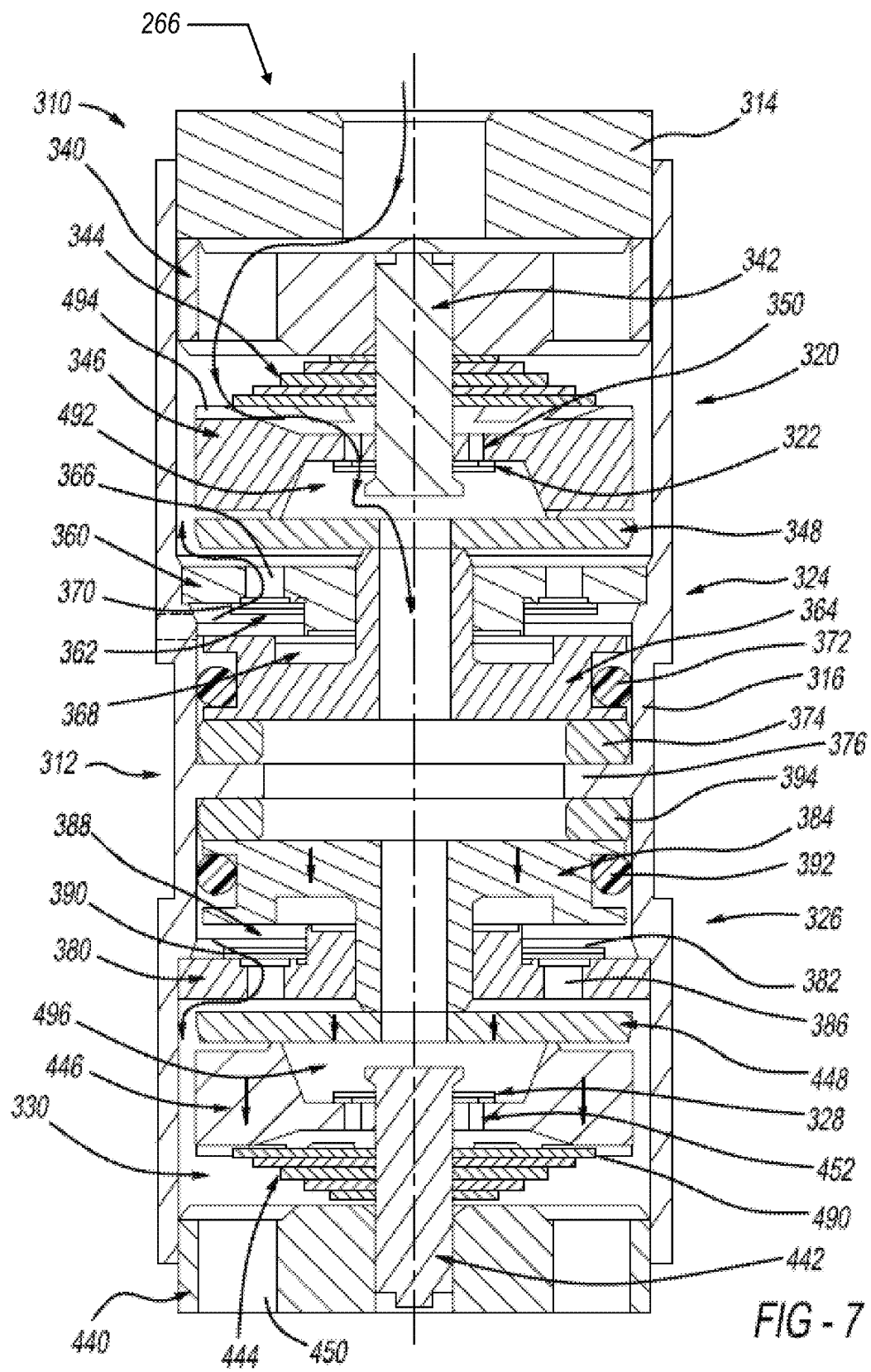
FIG. 7 is an enlarged cross-sectional side view illustrating the frequency dependent valve assembly shown in FIG. 5 during a low frequency rebound stroke.

Referring now to FIG. 7, fluid flow during a low frequency rebound stroke is illustrated. During a rebound stroke at low frequency, fluid enters frequency dependent valve assembly 266 through axial fluid passageway 166 in piston rod 34. Fluid flows between the plurality of valve discs 344 and valve body 346 through an orifice 494 and opens first check valve 322. Spool valve 384 moves slowly downwards together with interface 448 and valve body 446 against the plurality of valve discs 444. Chamber 388 is then pressurized as fluid can only escape chamber 388 through orifice 390. The downward movement of spool valve 384 increases the preload on the plurality of valve discs 444 which keep valve body 446 closed against interface 448 which block fluid flow from bypassing second disc valve assembly 330 by flowing between valve body 446 and interface 448.

Figure 8:
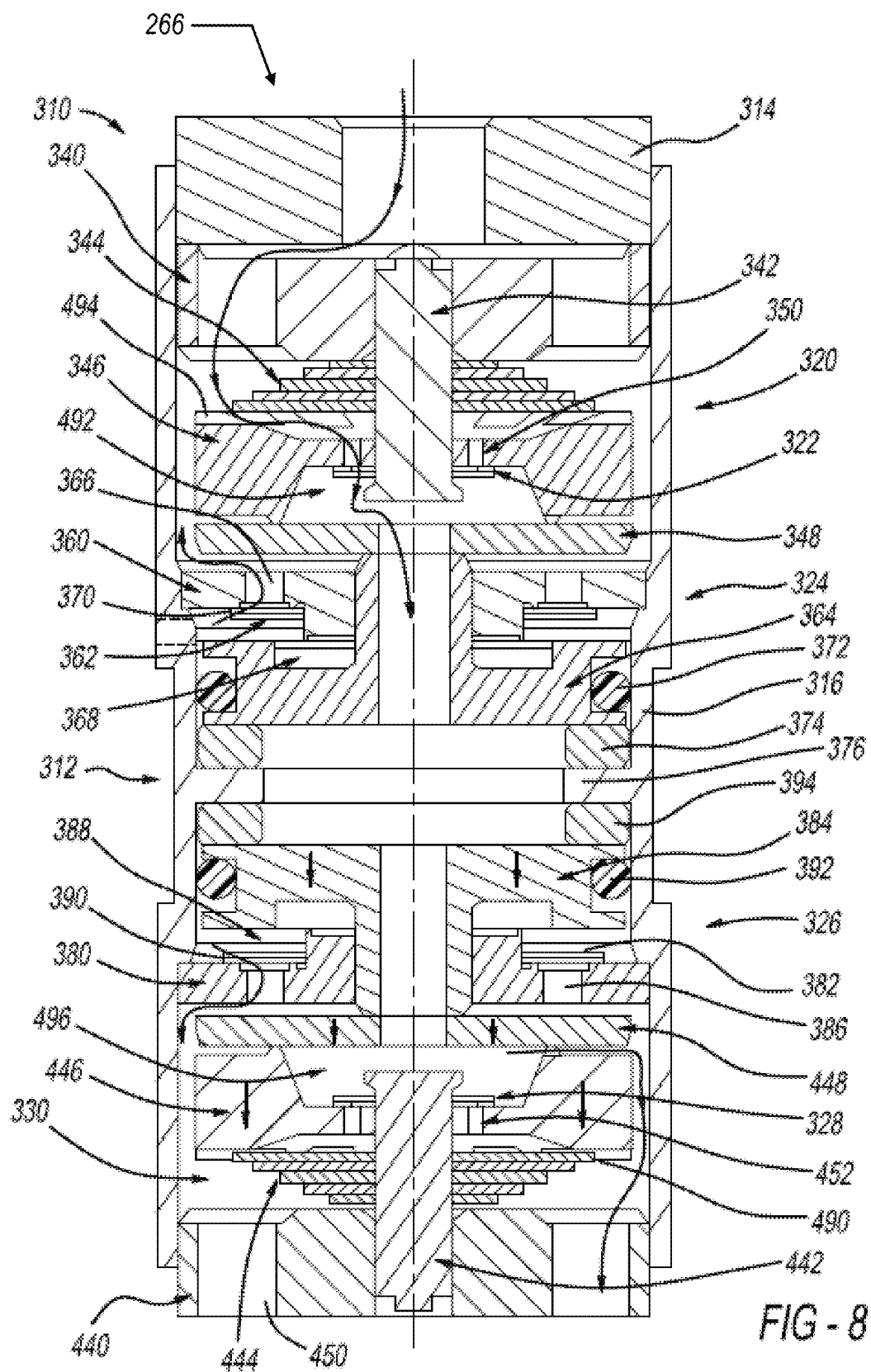
FIG. 8 is an enlarged cross-sectional side view illustrating the frequency dependent valve assembly shown in FIG. 5 during a high frequency rebound stroke.

Referring now to FIG. 8, fluid flow during a high frequency rebound stroke is illustrated. During a high frequency compression stroke, fluid enters frequency dependent valve assembly 266 through axial fluid passageway 166 in piston rod 34. Fluid flows between the plurality of valve discs 344 and valve body 346 through orifice 494 and opens first check valve 322. Spool valve 384 does not get time to move far enough downwards to push interface 448 and preload valve body 446 against the plurality of valve discs 444 because of the high frequency of the rebound stroke. Fluid pressure increases rapidly in a chamber 496 above valve body 446. The blow-off pressure in chamber 496 will eventually be high enough to lift valve body 446 away from interface 448 and fluid within chamber 496 will flow to lower working chamber 46 through the plurality of apertures 450 to create a bypass flow through piston assembly 32. Thus, during a high frequency rebound stroke, the fluid bypasses piston assembly 32 to provide a soft damping while during a low frequency rebound stroke, the bypass is closed resulting in a firmer damping.

The description of the invention is merely exemplary in nature and, thus, variations that do not depart from the gist of the invention are intended to be within the scope of the invention. Such variations are not to be regarded as a departure from the spirit and scope of the invention.

What is claimed is:
1. A shock absorber comprising:
a pressure tube defining a fluid chamber for containing a working fluid;
a piston assembly disposed within said pressure tube, said piston assembly dividing said fluid chamber into an upper working chamber and a lower working chamber;
a piston rod projecting out of said pressure tube and having a bore extending therethrough, said piston assembly being attached to said piston rod;

a frequency dependent valve assembly attached to said piston rod, said frequency dependent valve assembly comprising:
  a housing attached to said piston rod, said housing defining a fluid cavity;
  a spool valve assembly disposed within said fluid cavity, said spool valve assembly including a spool valve having a bore extending completely therethrough and a radially extending annular flange, said annular flange separating said fluid cavity into an upper chamber and a lower chamber, and a compression bypass valve assembly; wherein
movement of said spool valve within said fluid cavity controls an amount of fluid pressure required to open said compression bypass valve assembly, and thus allows a flow of said working fluid through said bore of said spool valve, completely bypassing said upper and lower chambers of said fluid cavity, and through said bore of said piston rod during a first frequency movement of said shock absorber, while at least substantially interrupting flow of said working fluid during a second frequency movement of said shock absorber which is of a lower frequency than said first frequency movement.

2. The shock absorber according to claim 1, wherein said frequency dependent valve assembly controls fluid flow from said lower working chamber to said upper working chamber.

3. A shock absorber, comprising:
  a pressure tube defining a fluid chamber for containing a working fluid;
  a piston assembly disposed within said pressure tube, said piston assembly dividing said fluid chamber into an upper working chamber and a lower working chamber;
  a piston rod projecting out of said pressure tube and having a bore extending therethrough, said piston assembly being attached to said piston rod;
  a frequency dependent valve assembly attached to said piston rod, said frequency dependent valve assembly comprising:
    a housing attached to said piston rod, said housing defining a fluid cavity;
    a first spool valve assembly disposed within said fluid cavity, said first spool valve assembly including a first spool valve having a first bore extending completely therethrough and a radially extending first annular flange, said first annular flange helping to define an upper chamber in said fluid cavity, and a compression bypass valve assembly; wherein
movement of said first spool valve within said fluid cavity controls an amount of fluid pressure required to open said compression bypass valve assembly, and thus allows a flow of said working fluid through said first bore of said first spool valve, completely bypassing said upper chamber of said fluid cavity, and through said first bore of said piston rod during a first frequency movement of said shock absorber, while at least substantially interrupting flow of said working fluid during a second frequency movement of said shock absorber which is of a lower frequency than said first frequency movement;
  a second spool valve assembly disposed within said fluid cavity, said second spool valve assembly including a second spool valve having a radially extending second annular flange which helps to define an upper chamber within said fluid cavity; and a second bore therethrough;

rebound bypass valve assembly operably associated with said second spool valve assembly; and
wherein movement of said second spool valve within said fluid cavity controls an amount of fluid pressure required to open said rebound bypass valve assembly; and
wherein said working fluid flowing through said second spool valve completely bypasses said lower chamber.

4. The shock absorber according to claim 3, wherein said frequency dependent valve assembly controls fluid flow from said lower working chamber to said upper working chamber.

5. The shock absorber according to claim 3, wherein said frequency dependent valve assembly controls fluid flow from said upper working chamber to said lower working chamber.

6. The shock absorber according to claim 1, wherein said bore of said piston rod defines a fluid passage extending between said upper working chamber and said fluid cavity.

7. The shock absorber according to claim 1, wherein said spool valve defines a fluid passage in direct fluid communication with said compression bypass valve assembly.

8. A shock absorber comprising:
  a pressure tube defining a fluid chamber for containing a working fluid;
  a piston assembly disposed within said pressure tube, said piston assembly dividing said fluid chamber into an upper working chamber and a lower working chamber;
  a piston rod projecting out of said pressure tube and having a bore extending therethrough, said piston assembly being attached to said piston rod;
  a frequency dependent valve assembly attached to said piston rod, said frequency dependent valve assembly comprising:
    a housing attached to said piston rod, said housing defining a fluid cavity;
    a spool valve assembly disposed within said fluid cavity, said spool valve assembly including a spool valve having a bore extending completely therethrough and a radially extending annular flange, said annular flange separating said fluid cavity into an upper chamber and a lower chamber, a compression bypass valve assembly and a rebound bypass valve assembly; wherein
movement of said spool valve within said fluid cavity controls an amount of fluid pressure required to open both said rebound bypass valve assembly and said compression bypass valve assembly and thus allows a flow of said working fluid through said bore of said first spool valve, completely bypassing said upper and lower chambers of said fluid cavity, and through said bore of said piston rod during a first frequency movement of said shock absorber, while at least substantially interrupting flow of said working fluid during a second frequency movement of said shock absorber which is of a lower frequency than said first frequency movement.

9. The shock absorber according to claim 8, wherein said frequency dependent valve assembly controls fluid flow from said upper working chamber to said lower working chamber.

10. The shock absorber according to claim 9, wherein said frequency dependent valve assembly controls fluid flow from said lower working chamber to said upper working chamber.

11. The shock absorber according to claim 8, wherein said bore of said spool valve defines a fluid passage in direct fluid communication with said compression bypass valve assembly.

12. The shock absorber according to claim 11, wherein said fluid passage defined by said bore of said spool valve is in direct fluid communication with said rebound bypass valve assembly.

13. The shock absorber according to claim 8, wherein said bore of said spool valve defines a fluid passage in direct fluid communication with said rebound bypass valve assembly.

14. The shock absorber according to claim 8, wherein said compression bypass valve assembly includes a first interface and a first valve disc, said frequency dependent valve assembly further comprising a first spring biasing said first valve disc into engagement with said first interface, a first biasing chamber being defined by said first interface and said first valve disc.

15. The shock absorber according to claim 14, wherein said bore of said spool valve defines a fluid passage in direct fluid communication with said first biasing chamber.

16. The shock absorber according to claim 14, wherein said rebound bypass valve assembly includes a second interface and a second valve disc, said frequency dependent valve assembly further comprising a second spring biasing said second valve disc into engagement with said second interface, a second biasing chamber being defined by said second interface and said second valve disc.

17. The shock absorber according to claim 16, wherein said bore of said spool valve defines a fluid passage in direct fluid communication with both said first and second biasing chambers.

18. The shock absorber according to claim 8, wherein said rebound bypass valve assembly includes an interface and a valve disc, said frequency dependent valve assembly further comprising a spring biasing said valve disc into engagement with said interface, a biasing chamber being defined by said interface and said valve disc.

19. The shock absorber according to claim 18, wherein said bore of said spool valve defines a fluid passage in direct fluid communication with said biasing chamber.

\* \* \* \* \*